US012810593B2

(12) United States Patent
Zhang et al.

(10) Patent No.: US 12,810,593 B2
(45) Date of Patent: Nov. 24, 2026

(54) METHOD, APPARATUS, DEVICE AND STORAGE MEDIUM FOR GENERATING CHARACTER STYLE PROFILE IMAGE

(71) Applicant: Beijing Bytedance Network Technology Co., Ltd., Beijing (CN)

(72) Inventors: Peng Zhang, Beijing (CN); Bingchuan Li, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 184 days.

(21) Appl. No.: 18/693,899

(22) PCT Filed: Oct. 25, 2022

(86) PCT No.: PCT/CN2022/127195
§ 371 (c)(1),
(2) Date: Mar. 20, 2024

(87) PCT Pub. No.: WO2023/072015
PCT Pub. Date: May 4, 2023

(65) Prior Publication Data

US 2024/0386640 A1 Nov. 21, 2024

(30) Foreign Application Priority Data

Oct. 25, 2021 (CN) .......................... 202111241440.2

(51) Int. Cl.
*G06V 10/774* (2022.01)
*G06T 11/60* (2026.01)
(Continued)

(52) U.S. Cl.
CPC ............ *G06V 10/774* (2022.01); *G06T 11/60* (2013.01); *G06V 10/26* (2022.01); *G06V 40/171* (2022.01); *G06V 10/82* (2022.01)

(58) Field of Classification Search
CPC . G06T 11/60; G06T 11/00; G06T 9/00; G06T 2207/30196; G06V 10/26; G06V 10/774; G06V 40/171; G06V 10/82
See application file for complete search history.

(56) References Cited

U.S. PATENT DOCUMENTS

2015/0006313 A1* 1/2015 Beaver ............... G06Q 30/0643 705/26.5
2016/0275107 A1 9/2016 Goodwin et al.
(Continued)

FOREIGN PATENT DOCUMENTS

CN 108846793 A 11/2018
CN 109559363 A 4/2019
(Continued)

OTHER PUBLICATIONS

Notification of Registration Procedures received from Chinese patent application No. 202111241440.2 mailed on Mar. 4, 2024, 8 pages (2 pages English Translation and 6 pages Original Copy).

*Primary Examiner* — Said Broome
*Assistant Examiner* — Andrew Shin

(57) ABSTRACT

Embodiments of the disclosure provide a method, apparatus, device and storage medium for generating character style profile image. The method includes: inputting an original character profile image into a first feature encoder to obtain first character profile feature code; determining an attribute increment between the original character profile image and a template image; inputting the attribute increment and the first character profile feature code into a second feature encoder to obtain a second character profile feature code; inputting the second character profile feature code into a style profile generative model to obtain an initial character style profile image; and merging the initial character style profile image into the template image to obtain a target character style profile image.

20 Claims, 6 Drawing Sheets

(51) Int. Cl.

| | |
|---|---|
| ***G06V 10/26*** | (2022.01) |
| ***G06V 10/82*** | (2022.01) |
| ***G06V 40/16*** | (2022.01) |

(56) References Cited

U.S. PATENT DOCUMENTS

| | | | | |
|---|---|---|---|---|
| 2019/0026870 | A1 | 1/2019 | Hu et al. | |
| 2019/0279075 | A1 | 9/2019 | Liu et al. | |
| 2020/0134778 | A1 | 4/2020 | He et al. | |
| 2020/0226724 | A1 | 7/2020 | Fang et al. | |
| 2020/0356591 | A1* | 11/2020 | Yada | G06F 16/583 |
| 2021/0209464 | A1 | 7/2021 | Bala et al. | |
| 2021/0358190 | A1* | 11/2021 | Choi | G06T 19/20 |
| 2022/0084270 | A1* | 3/2022 | Zhang | G06N 3/094 |

FOREIGN PATENT DOCUMENTS

| | | | |
|---|---|---|---|
| CN | 109685749 | A | 4/2019 |
| CN | 109829353 | A | 5/2019 |
| CN | 110555896 | A | 12/2019 |
| CN | 111783525 | A | 10/2020 |
| CN | 112861805 | A | 5/2021 |
| CN | 112989904 | A | 6/2021 |
| CN | 112991150 | A | 6/2021 |
| CN | 112991358 | A | 6/2021 |
| CN | 113409342 | A | 9/2021 |
| CN | 114004905 | A | 2/2022 |
| WO | 2021/129642 | A1 | 7/2021 |

* cited by examiner

METHOD, APPARATUS, DEVICE AND STORAGE MEDIUM FOR GENERATING CHARACTER STYLE PROFILE IMAGE

CROSS-REFERENCE

This application claims priority to the Chinese patent application filed with the Chinese Patent Office on Oct. 25, 2021, with application No. 202111241440.2, the entirety of which is incorporated herein by reference.

FIELD

The embodiments of the present disclosure relate to the field of image processing technology, such as to a method, apparatus, device, and storage medium for generating character style profile image.

BACKGROUND

With the development of technology, more and more application software come into users' lives, gradually enriching their leisure time, such as short video application (Application, APP), photo editing APP, etc. Among them, transforming character profile images into various styles of images becomes more and more popular among users.

SUMMARY

The embodiments of the present disclosure provide a method, apparatus, device, and storage medium for generating character style profile image, which can generate a character profile image with a set style, thereby improving diversity of the images.

The embodiments of the present disclosure provide a method for generating character style profile image, including:

- inputting an original character profile image into a first feature encoder to obtain first character profile feature code;
- determining an attribute increment between the original character profile image and a template image;
- inputting the attribute increment and the first character profile feature code into a second feature encoder to obtain a second character profile feature code;
- inputting the second character profile feature code into a style profile generative model to obtain an initial character style profile image; and
- merging the initial character style profile image into the template image to obtain a target character style profile image.

The embodiments of the present disclosure also provide an apparatus for generating character style profile image, including:

- a first character profile feature code obtaining module configured to input an original character profile image into a first feature encoder to obtain first character profile feature code;
- an attribute increment determining module configured to obtain an attribute increment between the original character profile image and a template image;
- a second character profile feature code obtaining module configured to input the attribute increment and the first character profile feature code into a second feature encoder to obtain a second character profile feature code;
- an initial character style profile image obtaining module configured to input the second character profile feature code into a style profile generative model to obtain an initial character style profile image; and
- a target character style profile image obtaining module configured to merge the initial character style profile image into the template image to obtain a target character style profile image.

The embodiments of the present disclosure also provide an electronic device, the electronic device including:

- one or more processing apparatuses;
- a storage apparatus configured to store at least one program;
- when the at least one program is executed by the at least one processing apparatus, the at least one processing apparatus implements the method for generating a character style profile image as described in the present disclosure.

The embodiments of the present disclosure also provide a computer-readable medium having a computer program stored thereon, which, when executed by a processing apparatus, implements the method for generating a character style profile image as described in the embodiments of the present disclosure.

DETAILED DESCRIPTION

Figure 1:
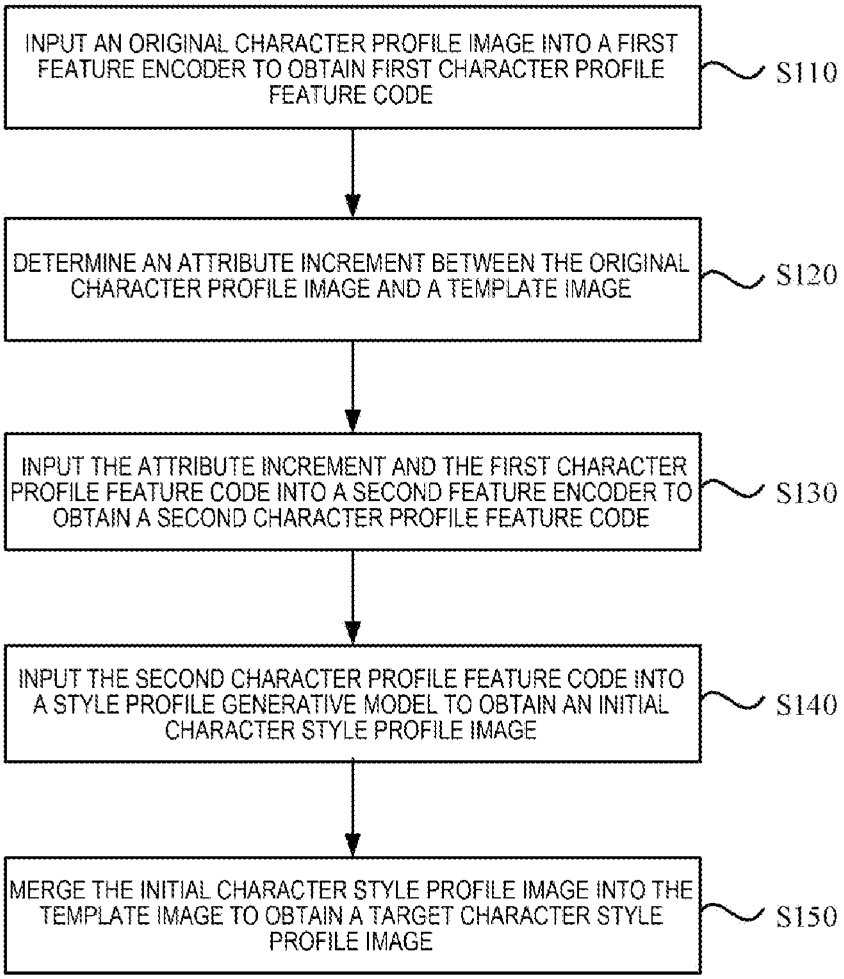
FIG. 1 is a flowchart of a method for generating a character style profile image in an embodiment of the present disclosure.

The following will describe the embodiments of the present disclosure with reference to the accompanying drawings. Although some embodiments of the present disclosure are shown in the drawings, it should be understood that the present disclosure can be implemented in various forms and is not limited to the embodiments set forth herein. It should be understood that the drawings and embodiments of the present disclosure are provided for illustrative purposes only and are not intended to limit the scope of protection of the present disclosure.

The term “including” and its variations as used herein are non-exclusive inclusion, i.e. “including but not limited to”. The term “based on” means “at least partially based on”. The term “one embodiment” means “at least one embodiment”; the term “another embodiment” means “at least one additional embodiment”; and the term “some embodiments” means “at least some embodiments”. Relevant definitions of other terms will be given in the following description.

It should be noted that the concepts of “first” and “second” mentioned in this disclosure are only used to distinguish different apparatuses, modules, or units, but are not used to limit the order or interdependence of the functions performed by these apparatuses, modules, or units.

It should be noted that the modifications of “one” and “a plurality of” mentioned in this disclosure are illustrative but not limiting. Those skilled in the art should understand that unless otherwise indicated in the context, they should be understood as “one or more”.

The names of the messages or information interacted between a plurality of apparatuses in this public implementation are for illustrative purposes only, which are not intended to limit the scope of these messages or information.

FIG. 1 is a flowchart of a method for generating a character style profile image provided in an embodiment of the present disclosure. The present embodiment can be applied to a case where a character profile is transformed into that of a set style. The method can be performed by an apparatus for generating a character style profile image, and the apparatus can be composed of hardware and/or software, and can generally be integrated into a device having a function of generating a character style profile image. The device can be an electronic device such as a server, a mobile terminal, or a server cluster. As shown in FIG. 1, the method includes the following steps:

Step 110, inputting an original character profile image into a first feature encoder to obtain first character profile feature code;

The original character profile image can be an image containing a character profile, which can be captured by a camera of the terminal device or obtained from a database. The first feature encoder may encode the input character profile image to obtain the first character profile feature code. The first character profile feature code may be represented by a multidimensional matrix.

In this embodiment, the first feature encoder is composed of a set neural network, and is obtained by training based on the character profile sample images.

A way for training the first feature encoder may include: obtaining a character profile sample image; inputting the character profile sample image into a first feature encoder to be trained to obtain a first sample character profile feature code; inputting a first sample character profile feature code into a character profile generative model to obtain a first reconstructed character profile image; and training the first feature encoder to be trained based on a loss function between the first reconstructed character profile image and the character profile sample image to obtain the first feature encoder.

Figure 2:
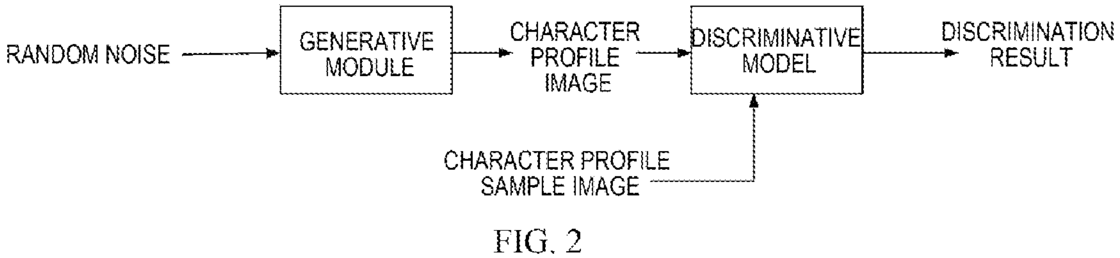
FIG. 2 is an example of training a character profile generative model in an embodiment of the present disclosure.

The character profile generative model can be a model obtained after training the generative adversarial network. FIG. 2 is an example diagram of training the character profile generative model in this embodiment. As shown in FIG. 2, a way for training the character profile generative model includes: cross-iteratively training the generative model and the discriminative model until the accuracy of the discrimination result output by the discriminative model meets a set condition, then the trained generative model is determined as the character profile generative model.

The process of cross-iteratively training includes: inputting first random noise data into the the generative model to obtain a first character profile image; inputting the first character profile image and a first character profile sample image into the discriminative model to obtain a first discrimination result; adjusting parameters in the generative model based on the first discrimination result; inputting second random noise data into the adjusted generative model to obtain a second character profile image; inputting the second character profile image and a second character profile sample image into the discriminative model to obtain a second discrimination result, and determining a real discrimination result between the second character profile image and the second character profile sample image; and adjusting parameters in the discriminative model according to a loss function between the second discrimination result and the real discrimination result.

The first character profile sample image and the second character profile sample image are sample images in the obtained character profile sample images.

Figure 3:
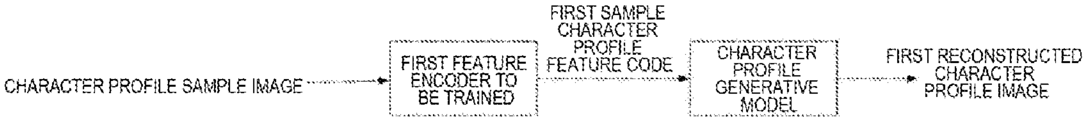
FIG. 3 is an example diagram of training a first feature encoder in an embodiment of the present disclosure.

In this embodiment, the first feature encoder is trained based on the character profile generative model that has been trained. For example, FIG. 3 is an example diagram of training the first feature encoder in this embodiment. As shown in FIG. 3, the character profile sample image is first input into the first feature encoder to be trained to encode the character profile sample image, and the first sample character profile feature code is output. Then, the first sample character profile feature code is input into the character profile generative model to output a first reconstructed character profile image. Finally, the first feature encoder to be trained is trained based on a loss function between the first reconstructed character profile image and the character profile sample image, to obtain the first feature encoder.

Step 120, determining an attribute increment between the original character profile image and a template image.

Attributes may include an age, hair color, gender and a deflection angle of the profile and whether the eyes of the profile are open, etc. The template image can be an image that matches the character style. For example, if the character style is “Halloween” style, the template image is an image that matches the “Halloween” style.

In this embodiment, a way for determining the attribute increment between the original character profile image and the template image may include: inputting the original character profile image into a attribute recognizer, outputting character attribute information, inputting the template image into the attribute recognizer, obtaining template attribute information, calculating a difference between the character attribute information and the template attribute information, and thus obtaining the attribute increment. The attribute recognizer can be constructed based on a set neural network.

Step 130, inputting the attribute increment and the first character profile feature code into a second feature encoder to obtain a second character profile feature code.

The second character profile feature code can be understood as character profile feature code added with attribute increment information. The second feature encoder may encode the input attribute increment and the first character profile feature code to obtain the second character profile feature code. The second character profile feature code may be represented by a multidimensional matrix.

In this embodiment, the second feature encoder may be obtained by training based on the character profile generative model and the first feature encoder that have been trained. With respect to training process of the character profile generative model and the first feature encoder, the above embodiment may be referred to, which will not be repeated here.

A way for training the second feature encoder includes: obtaining a character profile sample image; inputting the character profile sample image into the first feature encoder to obtain a second sample character profile feature code; inputting the second sample character profile feature code into a character profile generative model to obtain a second reconstructed character profile image; inputting the second sample character profile feature code and a real attribute increment into a second feature encoder to be trained to obtain a third sample character profile feature code; inputting the third sample character profile feature code into the character profile generative model to obtain an edited character profile image; determining a predictive attribute increment between the second reconstructed character profile image and the edited character profile image; and training the second feature encoder to be trained based on a loss function between the predictive attribute increment and the real attribute increment to obtain the second feature encoder.

Figure 4:
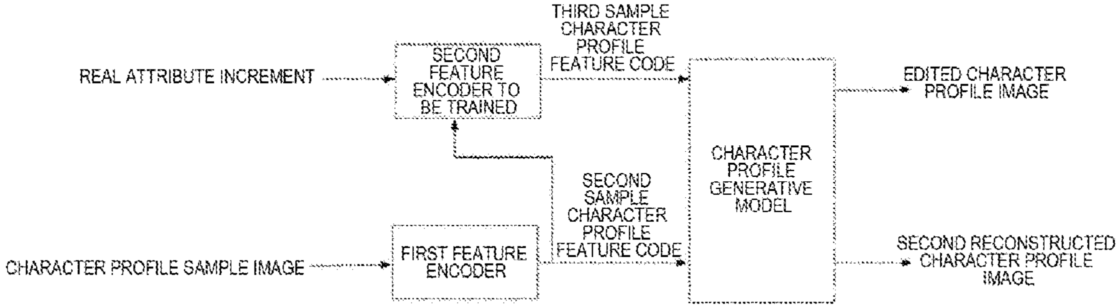
FIG. 4 is an example diagram of training a second feature encoder in an embodiment of the present disclosure.

The character profile sample images may be a large number of character profile images at different angles or under different light. The method of determining the predictive attribute increment between the second reconstructed character profile image and the edited character profile image may include: inputting the second reconstructed character profile image and the edited character profile image respectively into the attribute recognizer to obtain their attribute information, and then calculate the difference between the attribute information of the second reconstructed character profile image and the attribute information of the edited character profile image to obtain the predictive attribute increment. FIG. 4 is an example diagram of training the second feature encoder in this embodiment. As shown in FIG. 4, first, the character profile sample image is input into the first feature encoder, and the second sample character profile feature code is output; then the second sample character profile feature code is input into a character profile generative model and a second reconstructed character profile image is output; then the second sample character profile feature code and a real attribute increment is input into the second feature encoder to be trained and a third sample character profile feature code is output; the third sample character profile feature code is input into the character profile generative model and an edited character profile image is output; finally, a predictive attribute increment between the second reconstructed character profile image and the edited character profile image is determined, and the second feature encoder to be trained is trained based on a loss function between the predictive attribute increment and the real attribute increment to obtain the second feature encoder.

Step 140, inputting the second character profile feature code into a style profile generative model to obtain an initial character style profile image.

Figure 5:
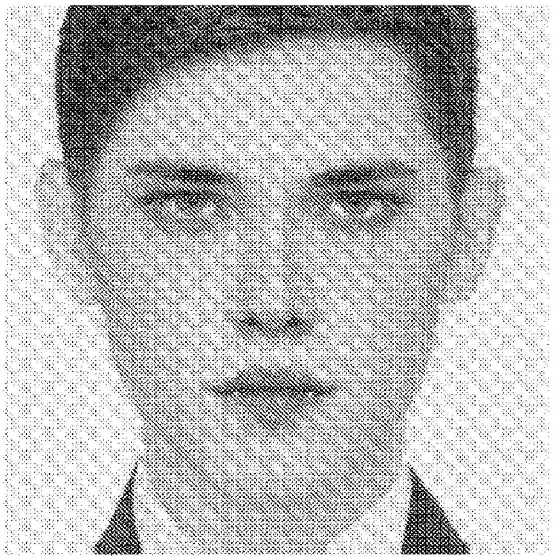
FIG. 5 shows a character style profile image in an embodiment of the present disclosure.

The style profile generative model may transform the character profile into a character profile with a set style. In this embodiment, the set style can be a "Halloween" style. For example, FIG. 5 is a character style profile image in this embodiment. As shown in FIG. 5, the eyes, mouth, skin, and hair in the portrait profile are processed in a "Halloween" style, making the character profile have a "Halloween" style.

In this embodiment, the style profile generative model may be obtained by training based on the trained character profile generative model. The training process of the character profile generative model can refer to the above embodiments, which are not repeated here.

Figure 6:
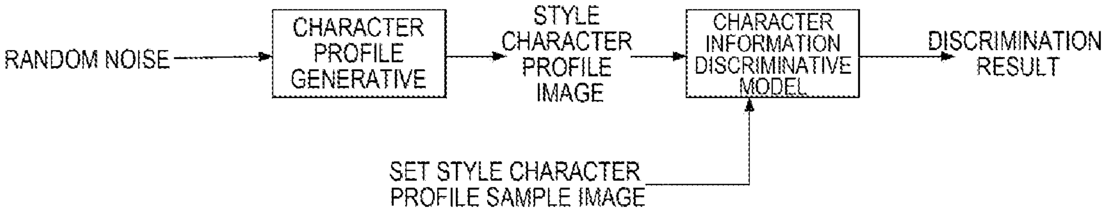
FIG. 6 is an example diagram of training a style profile generative model in an embodiment of the present disclosure.

FIG. 6 is an example diagram of training a style profile generative model in the present embodiment, as shown in FIG. 6, the way for training the style profile generative model includes: cross-iteratively training a character profile generative model and a character profile discriminative model until an accuracy of a discrimination result output by the character profile discriminative model meets a set condition, and determining the trained character profile generative model as the style profile generative model.

The process of cross-iteratively training includes: obtaining a set style character profile sample image; inputting first random noise data into the character profile generative model to obtain a first style character profile image; inputting the first style character profile image and the set style character profile sample image into the character profile discriminative model to obtain a first discrimination result; adjusting parameters in the character profile generative model based on the first discrimination result; inputting second random noise data into the adjusted character profile generative model to obtain a second style character profile image; inputting the second style character profile image and the set style character profile sample image into the character profile discriminative model to obtain a second discrimination result, and determining a real discrimination result between the second style character profile image and the set style character profile sample image; and adjusting parameters in the character discriminative model according to a loss function between the second discrimination result and the real discrimination result.

The set style character profile sample image can be a character profile image with a "Halloween" style, which can be obtained through virtual character rendering or retouching.

Step 150, merging the initial character style profile image into the template image to obtain a target character style profile image.

The template image can be an image that matches the set style. For example, if the set style is a "Halloween" style, the template image is an image that matches the "Halloween" style. For example, FIGS. 7*a*-7*d* are template images of the set style. FIGS. 7*a*-7*d* are style images that match the "Halloween" style, and the number of character profiles is changed from 1 to 4.

In this embodiment, in order to ensure that the size and position of the character style profile image match those of the template image, it is necessary to adjust the initial character style profile image.

For example, the process of merging the initial character style profile image into the template image to obtain a target character style profile image includes: translating a position of a character style profile in the initial character style profile image; and merging the initial character style profile image after translation into the template image to obtain the target character style profile image.

For example, the character style profile may be translated to a center of the initial character style profile image.

Optionally, a way for translating the character style profile in the initial character style profile image to the center of the initial character style profile image may include aligning the central key point of the character style profile with the central point of the initial character style profile image.

A distance difference between a horizontal coordinate of a central key point of the character style profile and a horizontal coordinate of a central point of the initial character style profile image is calculated, and the distance difference between the horizontal coordinate of the central key point of the character style profile and the horizontal coordinate of the central point of the initial character style profile image is determined as a horizontal distance difference. A distance difference between a vertical coordinate of the central key point of the character style profile and a vertical coordinate of the central point of the initial character style profile image is calculated, and the distance difference between the vertical coordinate of the central key point of the character style profile and the vertical coordinate of the central point of the initial character style profile image is determined as a vertical distance difference. The character style profile is translated along the horizontal direction according to the horizontal distance difference, and the character style profile image is translated reversely along the vertical direction according to the vertical distance difference, until the central key point of the character style profile is aligned with the central point of the initial character style profile image.

Optionally, the way for translating the character style profile in the initial character style profile image to the center of the initial character style profile image may include: obtaining a vertical standard line and a horizontal standard line of the initial character style profile image; extracting a central key point and a mouth corner key point of the character style profile in the initial character style profile image; determining a distance difference between a vertical coordinate of the central key point and the vertical standard line, and determining the distance difference between the vertical coordinate of the central key point and the vertical standard line as a first distance difference; determining a distance difference between a horizontal coordinate of the mouth corner key point and the horizontal standard line, and determining the distance difference between the horizontal coordinate of the mouth corner key point and the horizontal standard line as the second distance difference; and translating the character style profile along a vertical direction according to the first distance difference, and translating the character style profile along a horizontal direction according to the second distance difference, to translate the character style profile to the center of the initial character style profile image.

Figure 8:
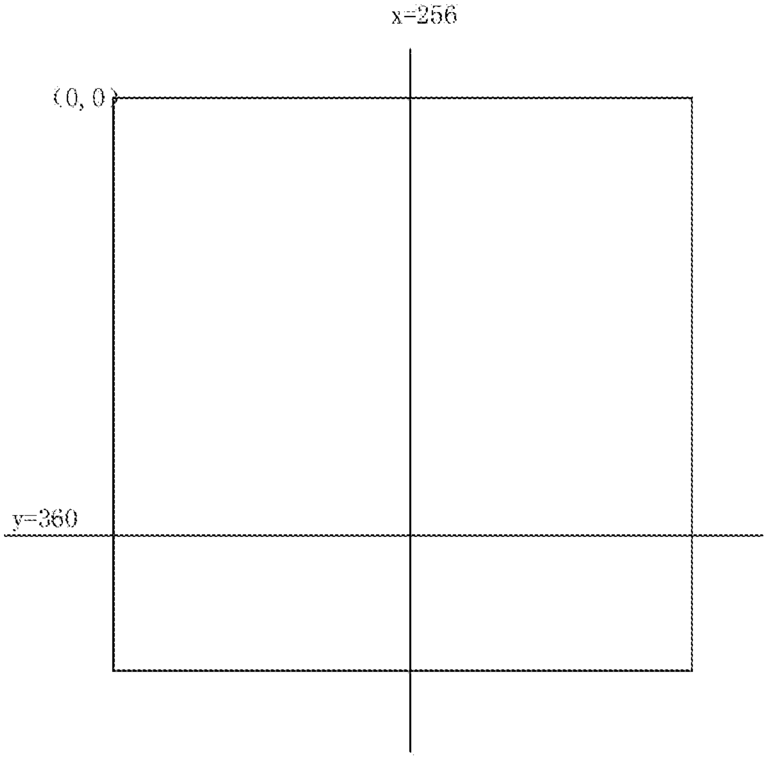
FIG. 8 is an example diagram of translating the character style profile in the embodiments of the present disclosure.

The vertical standard line and the horizontal standard line can be set according to the size of the initial character style profile image and the user's needs. For example, FIG. 8 is an example diagram of translating the character style profile in this embodiment. As shown in FIG. 8, assuming a size of the initial character style profile image is 512*512, a world coordinate system is established by taking a vertex at the upper left corner of the initial character style profile image as the origin, and the vertical standard line is set to x=256 and the horizontal standard line is set to y=360. The character style profile is translated so that the central key point of the character style profile falls on the vertical standard line and the mouth corner key point falls on the horizontal standard line.

The process of the merging the initial character style profile image into the template image to obtain a target character style profile image may include: recognizing a template character profile in the template image to obtain a recognition rectangle box; cropping the initial character style profile image into an image of a set size according to the recognition rectangle box; pasting the image of the set size into the recognition rectangle box; obtaining a character profile mask image of the template image; and merging the image of the set size pasted into the recognition rectangle box into the template image based on the character profile mask image, to obtain the target character style profile image.

Figure 7A:
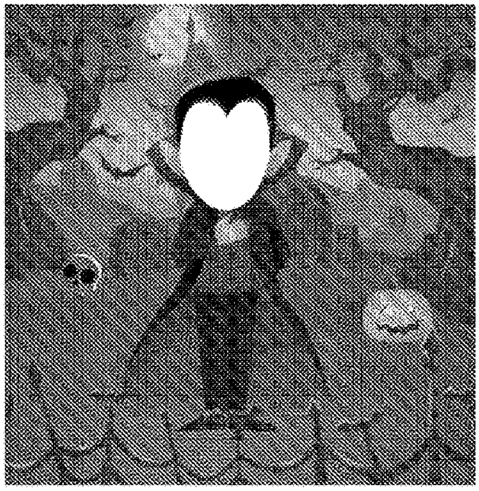
FIG. 7*a* is a template image of a set style in an embodiment of the present disclosure.
Figure 7B:
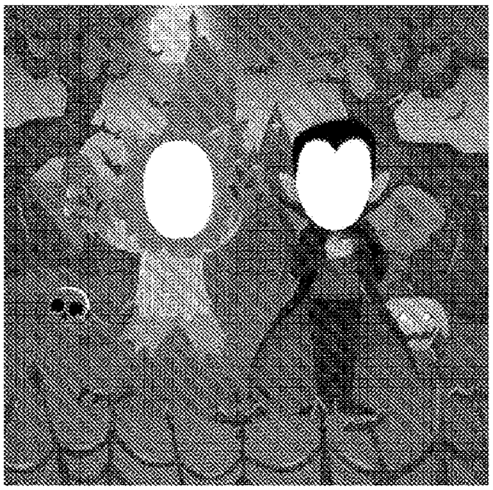
FIG. 7*b* is a template image of another set style in an embodiment of the present disclosure.
Figure 7C:
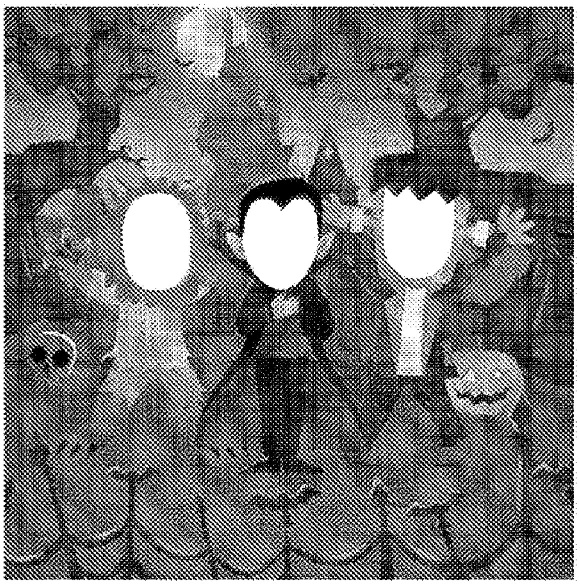
FIG. 7*c* is a template image of another set style in an embodiment of the present disclosure.
Figure 7D:
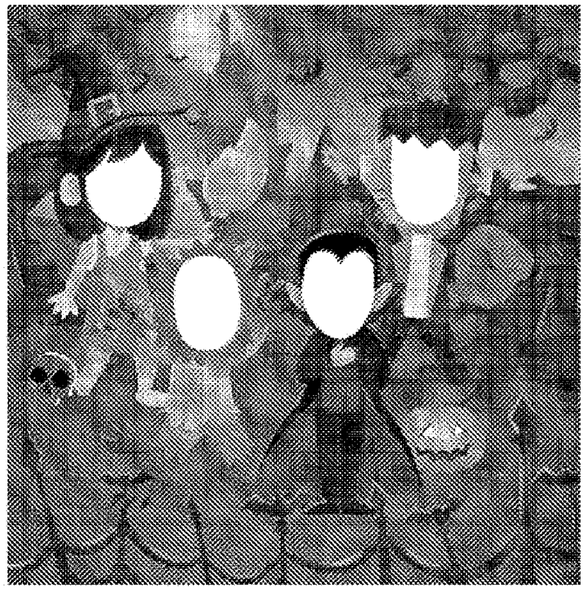
FIG. 7*d* is a template image of another set style in an embodiment of the present disclosure.

Even if the size of the cropped initial character style profile image is the same as that of the recognition rectangle box, the set size can be determined by the size of the recognition rectangle box. The character profile mask image can be understood as a binary image composed of areas surrounded by the template character profile in the template image, for example, the image surrounded by the white areas in FIGS. 7*a*-7*b* is the character profile mask image. In this embodiment, the way for pasting the image of the set size to the recognition rectangle box may include aligning the vertex at the upper left corner of the image of the set size with the vertex at the upper left corner of the recognition rectangle box.

In this embodiment, the merging the image of the set size into the template image based on the character profile mask image may include: calculating according to the following formula: R=(mask*output)+(1−mask)*template. Where R is a pixel matrix of the target character style profile image, mask is a pixel matrix of the character profile mask image, output is the pixel matrix of the image of the set size, and template is the pixel matrix of the template image.

The technical solution of the embodiment of the present disclosure inputs an original character profile image into a first feature encoder to obtain first character profile feature code; determines an attribute increment between the original character profile image and a template image; inputs the attribute increment and the first character profile feature code into a second feature encoder to obtain a second character profile feature code; inputs the second character profile feature code into a style profile generative model to obtain an initial character style profile image; and merges the initial character style profile image into the template image to obtain a target character style profile image. The method for generating a character style profile image provided in the embodiments of the present disclosure can generate a character profile image with a set style, thereby improving diversity of the images.

Figure 9:
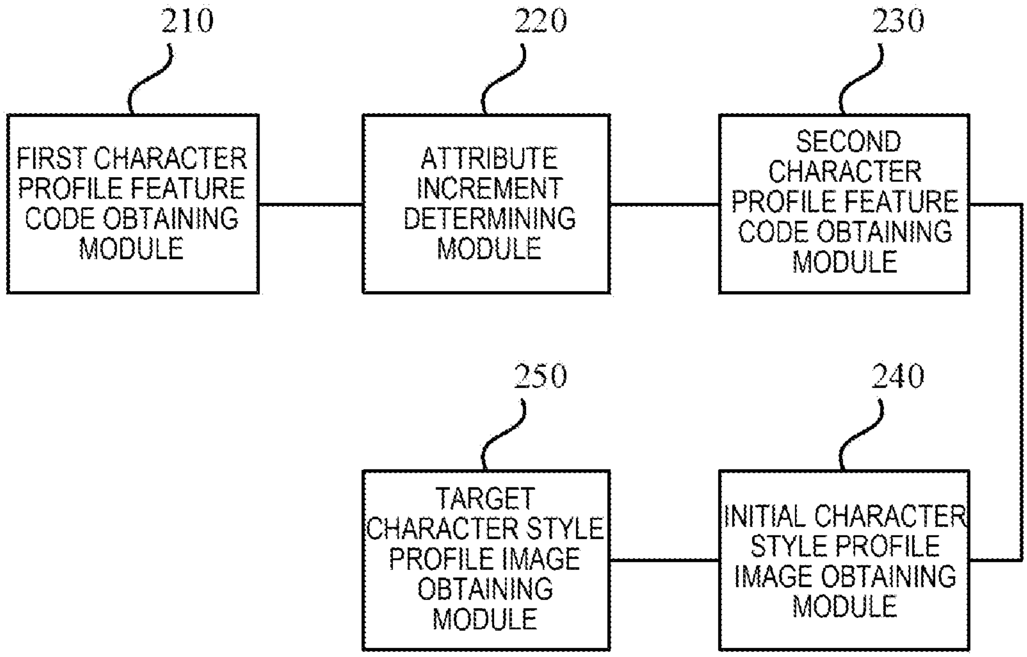
FIG. 9 is a structural schematic diagram of an apparatus for generating a character style profile image in an embodiment of the present disclosure.

FIG. 9 is a structural schematic diagram of an apparatus for generating a character style profile image disclosed in the embodiments of the present application. As shown in FIG. 9, the apparatus includes: a first character profile feature code obtaining module 210 configured to input an original character profile image into a first feature encoder to obtain first character profile feature code; an attribute increment determining module 220 configured to obtain an attribute increment between the original character profile image and a template image; a second character profile feature code obtaining module 230 configured to input the attribute increment and first character profile feature code into a second feature encoder to obtain a second character profile feature code; an initial character style profile image obtaining module 240 configured to input the second character profile feature code into a style profile generative model to obtain an initial character style profile image; and a target character style profile image obtaining module 250 configured to merge the initial character style profile image into the template image to obtain a target character style profile image.

Optionally, the target character style profile image obtaining module 250 is configured to translate a character style profile in the initial character style profile image to a center of the image; and merge the initial character style profile image after translation into the template image to obtain the target character style profile image.

Optionally, the target character style profile image obtaining module 250 is configured to translate the character style profile in the initial character style profile image to the center of the image by obtaining a vertical standard line and a horizontal standard line of the initial character style profile image; extract a central key point and a mouth corner key point of the character style profile in the initial character style profile image; determine a distance difference between a vertical coordinate of the central key point and the vertical standard line, and determine the distance difference between the vertical coordinate of the central key point and the vertical standard line as a first distance difference; determine a distance difference between a horizontal coordinate of the mouth corner key point and the horizontal standard line, and determine the distance difference between the horizontal coordinate of the mouth corner key point and the horizontal standard line as the second distance difference; and translate the character style profile along a vertical direction according to the first distance difference, and translate the character style profile along a horizontal direction according to the second distance difference, to translate the character style profile to the center of the image.

Optionally, the target character style profile image obtaining module 250 is configured to recognize a template character profile in the template image to obtain a recognition rectangle box; crop the initial character style profile image into an image of a set size according to the recognition rectangle box; paste the image of the set size into the recognition rectangle box; obtain a character profile mask image of the template image; and merge the image of the set size pasted into the recognition rectangle box into the template image based on the character profile mask image, to obtain the target character style profile image.

Optionally, the apparatus for generating a character style profile image further includes a first feature encoder training module configured to: obtain a character profile sample image; input the character profile sample image into a first feature encoder to be trained to obtain a first sample character profile feature code; input a first sample character profile feature code into a character profile generative model to obtain a first reconstructed character profile image; and train the first feature encoder to be trained based on a loss function between the first reconstructed character profile image and the character profile sample image to obtain the first feature encoder.

Optionally, the apparatus for generating a character style profile image further includes a second feature encoder training module configured to: obtain a character profile sample image; input the character profile sample image into the first feature encoder to obtain a second sample character profile feature code; input the second sample character profile feature code into a character profile generative model to obtain a second reconstructed character profile image; input the second sample character profile feature code and a real attribute increment into a second feature encoder to be trained to obtain a third sample character profile feature code; input the third sample character profile feature code into the character profile generative model to obtain an edited character profile image; determine a predictive attribute increment between the second reconstructed character profile image and the edited character profile image; and train the second feature encoder to be trained based on a loss function between the predictive attribute increment and the real attribute increment to obtain the second feature encoder.

Optionally, the apparatus for generating a character style profile image further includes a style profile generative model training module configured to: cross-iteratively train a character profile generative model and a character profile discriminative model until an accuracy of a discrimination result output by the character profile discriminative model meets a set condition, and determine the trained character profile generative model as the style profile generative model; a process of cross-iteratively training includes: obtain a set style character profile sample image; input first random noise data into the character profile generative model to obtain a first style character profile image; input the first style character profile image and the set style character profile sample image into the character profile discriminative model to obtain a first discrimination result; adjust parameters in the character profile generative model based on the first discrimination result; input second random noise data into the adjusted character profile generative model to obtain a second style character profile image; input the second style character profile image and the set style character profile sample image into the character profile discriminative model to obtain a second discrimination result, and determine a real discrimination result between the second style character profile image and the set style character profile sample image; and adjust parameters in the character discriminative model according to a loss function between the second discrimination result and the real discrimination result.

The above apparatus can execute the methods provided in all the previous embodiments of the present disclosure, and has the corresponding functional modules and effects for executing the above methods. Technical details not described in this embodiment can be found in the description of the methods provided in all the previous embodiments of the present disclosure.

Figure 10:
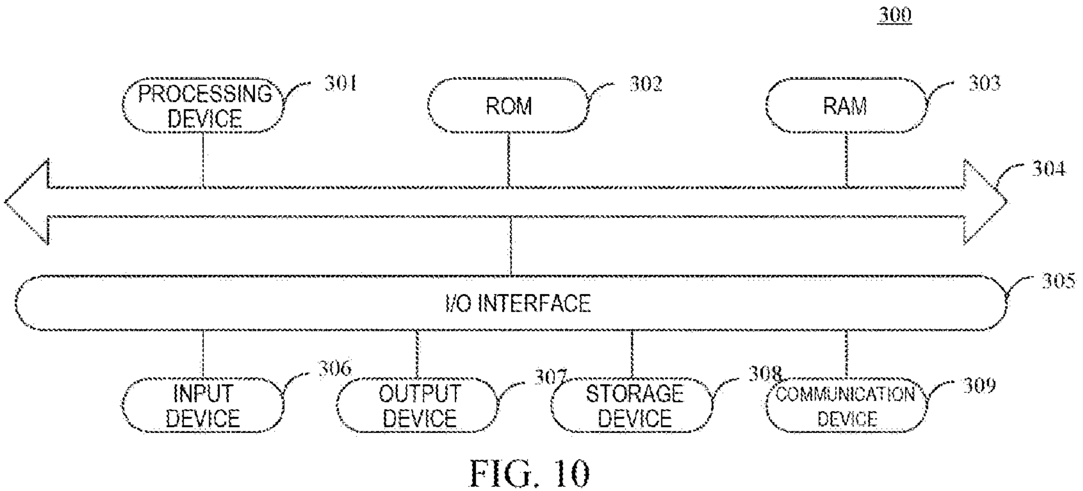
FIG. 10 is a structural schematic diagram of an electronic device in an embodiment of the present disclosure.

Referring now to FIG. 10, it is a structural schematic diagram of an electronic device 300 suitable for implementing an embodiment of the present disclosure. The electronic device in the embodiment of the present disclosure may include but is not limited to mobile terminals such as mobile phones, laptops, digital broadcast receivers, personal digital assistants (PDAs), tablet pads (PAD), portable multimedia players (PMPs), car-mounted terminals (such as car navigation terminals), etc., and fixed terminals such as digital TVs, desktop computers, etc., or various forms of servers such as stand-alone servers or server clusters. The electronic device shown in FIG. 10 is only an example and should not bring any limitation on the functionality and scope of use of the embodiment of the present disclosure.

As shown in FIG. 10, the electronic device 300 may include a processing apparatus (such as a central processing unit, graphics processing unit, etc.) 301, the electronic device 300 may perform various actions and processes based on programs stored in Read-Only Memory (ROM) 302 or loaded from storage apparatus 305 into Random Access Memory (RAM) 303. In the RAM 303, various programs and data necessary for the operation of the electronic device 300 are also stored. The processing apparatus 301, ROM 302, and RAM 303 are connected to each other through a bus 304. An Input/Output (I/O) interface 305 is also connected to the bus 304.

Typically, the following apparatuses can be connected to I/O interface 305: input apparatuses 306 including, for example, touch screens, touchpads, keyboards, mice, cameras, microphones, accelerometers, gyroscopes, etc.; output apparatuses 307 including liquid crystal displays (LCDs), speakers, vibrators, etc.; storage apparatuses 308 including magnetic tapes, hard disks, etc.; and a communication apparatus 309. The communication apparatus 309 may allow the electronic device 300 to communicate with other apparatuses wirelessly or wirelessly to exchange data.

According to embodiments of the present disclosure, the process described above with reference to the flowchart can be implemented as a computer software program. For example, an embodiment of the present disclosure includes a computer program product, and the computer program product includes a computer program carried on a computer-readable medium, where the computer program includes program code for performing a method for recommending words. In such an embodiment, the computer program can be downloaded and installed from a network through the communication apparatus 309, or installed through the storage apparatus 305, or installed through the ROM 302. When the computer program is executed by the processing apparatus 301, the above functions defined in the method of the embodiment of the present disclosure are performed.

It should be noted that the computer-readable medium described above can be a computer-readable signal medium or a computer-readable storage medium, or any combination thereof. The computer-readable storage medium can be, for example, but not limited to, an electrical, magnetic, optical, electromagnetic, infrared, or semiconductor system, apparatus, or device, or any combination thereof. The computer-readable storage media may include but are not limited to: an electrical connection with one or more wires, a portable computer disk, a hard disk, random access memory (RAM), read-only memory (ROM), an erasable programmable read-only memory (EPROM or flash memory), an optical fiber, a portable compact disk read-only memory (CD-ROM), an optical storage device, a magnetic storage device, or any combination thereof. In the present disclosure, a computer-readable storage medium may be any tangible medium containing or storing a program that can be used by an instruction execution system, apparatus, or device, or can be used in combination with an instruction execution system, apparatus, or device. In the present disclosure, a computer-readable signal medium can include a data signal propagated in baseband or as a carrier wave, the computer-readable signal medium carries computer-readable program code therein. Such propagated data signals may take many forms, including but not limited to electromagnetic signals, optical signals, or any combination thereof. A computer-readable signal medium may also be any computer-readable medium other than a computer-readable storage medium, which can send, propagate, or transmit programs for use by or in conjunction with instruction execution systems, apparatus, or devices. The program code contained on the computer-readable medium may be transmitted using any suitable medium, the medium includes but not limited to: wires, optical cables, RF (radio frequency), etc., or any combination thereof.

In some embodiments, clients and servers can communicate using any currently known or future developed network protocol such as Hyper Text Transfer Protocol (HTTP), and can be interconnected with any form or medium of digital data communication (such as communication networks). Examples of communication networks include local area networks (LANs), wide area networks (WANs), internetworks (such as the Internet), and end-to-end networks (such as ad hoc end-to-end networks), as well as any currently known or future developed networks.

The computer-readable medium may be included in the electronic device or may exist separately without being assembled into the electronic device.

The computer-readable medium carries one or more programs, and when the one or more programs are executed by the electronic device, the electronic device performs the following steps: inputting an original character profile image into a first feature encoder to obtain first character profile feature code; determining an attribute increment between the original character profile image and a template image; inputting the attribute increment and the first character profile feature code into a second feature encoder to obtain a second character profile feature code; inputting the second character profile feature code into a style profile generative model to obtain an initial character style profile image; and merging the initial character style profile image into the template image to obtain a target character style profile image.

Computer program codes for performing the operations of the present disclosure may be written in one or more programming languages or a combination thereof, including but not limited to Object Oriented programming languages—such as Java, Smalltalk, C++, and also conventional procedural programming languages—such as "C" or similar programming languages. The program code may be executed entirely on the user's computer, partially executed on the user's computer, executed as a standalone software package, partially executed on the user's computer and partially on a remote computer, or entirely on a remote computer or server. In the case of involving a remote computer, the remote computer may be any kind of network—including LAN or WAN—connected to the user's computer, or may be connected to an external computer (e.g., through an Internet service provider to connect via the Internet).

The flowcharts and block diagrams in the accompanying drawings illustrate the architecture, functions, and operations of possible implementations of the system, method, and computer program product of various embodiments of the present disclosure. Each block in a flowchart or block diagram may represent a module, program segment, or portion of code that contains one or more executable instructions for implementing a specified logical function. It should also be noted that in some alternative implementations, the functions marked in the blocks may occur in a different order than those marked in the drawings. For example, two consecutive blocks may actually be executed in parallel, or they may sometimes be executed in reverse order, depending on the function involved. It should also be noted that each block in the block diagrams and/or flowcharts, as well as combinations of blocks in the block diagrams and/or flowcharts, may be implemented using a dedicated hardware-based system that performs the specified function or operations, or may be implemented using a combination of dedicated hardware and computer instructions.

The units in the embodiments of the present disclosure may be implemented by means of software or hardware, and the name of the unit does not constitute a limitation on the unit itself.

The functions described herein above can be performed at least in part by one or more hardware logic components. For example, without limitation, exemplary types of hardware logic components that may be used include: Field Programmable Gate Arrays (FPGAs), Application Specific Integrated Circuits (ASICs), Application Specific Standard Parts (ASSPs), System on Chip (SOCs), Complex Programmable Logic Devices (CPLDs), and so on.

In the context of this disclosure, a machine-readable medium can be a tangible medium that may contain or store programs for use by or in conjunction with instruction execution systems, apparatuses, or devices. A machine-readable medium may be a machine-readable signal medium or a machine-readable storage medium. A machine-readable medium may include, but are not limited to, electronic, magnetic, optical, electromagnetic, infrared, or semiconductor systems, apparatuses, or devices, or any suitable combination thereof. Specific examples of the machine-readable storage medium may include electrical connections based on one or more wires, portable computer disks, hard disks, RAM, ROM, EPROM or flash memory, optical fibers, CD-ROM, optical storage devices, magnetic storage devices, or any combination thereof.

According to one or more embodiments of the present disclosure, the present disclosure discloses a method for generating a character style profile image, including: inputting an original character profile image into a first feature encoder to obtain first character profile feature code; determining an attribute increment between the original character profile image and a template image; inputting the attribute increment and the first character profile feature code into a second feature encoder to obtain a second character profile feature code; inputting the second character profile feature code into a style profile generative model to obtain an initial character style profile image; and merging the initial character style profile image into the template image to obtain a target character style profile image.

The merging the initial character style profile image into the template image to obtain a target character style profile image, includes: translating a position of a character style profile in the initial character style profile image; and merging the initial character style profile image after translation into the template image to obtain the target character style profile image.

The translating a position of a character style profile in the initial character style profile image, includes: obtaining a vertical standard line and a horizontal standard line of the initial character style profile image; extracting a central key point and a mouth corner key point of the character style profile in the initial character style profile image; determining a distance difference between a vertical coordinate of the central key point and the vertical standard line, and determining the distance difference between the vertical coordinate of the central key point and the vertical standard line as a first distance difference; determining a distance difference between a horizontal coordinate of the mouth corner key point and the horizontal standard line, and determining the distance difference between the horizontal coordinate of the mouth corner key point and the horizontal standard line as the second distance difference; and translating the character style profile along a vertical direction according to the first distance difference, and translating the character style profile along a horizontal direction according to the second distance difference.

The merging the initial character style profile image into the template image to obtain a target character style profile image, includes: recognizing a template character profile in the template image to obtain a recognition rectangle box; cropping the initial character style profile image into an image of a set size according to the recognition rectangle box; pasting the image of the set size into the recognition rectangle box; obtaining a character profile mask image of the template image; and merging the image of the set size pasted into the recognition rectangle box into the template image based on the character profile mask image, to obtain the target character style profile image.

The way for training the first feature encoder includes: obtaining a character profile sample image; inputting the character profile sample image into a first feature encoder to be trained to obtain a first sample character profile feature code; inputting a first sample character profile feature code into a character profile generative model to obtain a first reconstructed character profile image; and training the first feature encoder to be trained based on a loss function between the first reconstructed character profile image and the character profile sample image to obtain the first feature encoder.

The way for training the second feature encoder includes: obtaining a character profile sample image; inputting the character profile sample image into the first feature encoder to obtain a second sample character profile feature code; inputting the second sample character profile feature code into a character profile generative model to obtain a second reconstructed character profile image; inputting the second sample character profile feature code and a real attribute increment into a second feature encoder to be trained to obtain a third sample character profile feature code; inputting the third sample character profile feature code into the character profile generative model to obtain an edited character profile image; determining a predictive attribute increment between the second reconstructed character profile image and the edited character profile image; and training the second feature encoder to be trained based on a loss function between the predictive attribute increment and the real attribute increment to obtain the second feature encoder.

The way for training the style profile generative model includes: cross-iteratively training a character profile generative model and a character profile discriminative model until an accuracy of a discrimination result output by the character profile discriminative model meets a set condition, and determining the trained character profile generative model as the style profile generative model; a process of cross-iteratively training includes: obtaining a set style character profile sample image; inputting first random noise data into the character profile generative model to obtain a first style character profile image; inputting the first style character profile image and the set style character profile sample image into the character profile discriminative model to obtain a first discrimination result; adjusting parameters in the character profile generative model based on the first discrimination result; inputting second random noise data into the adjusted character profile generative model to obtain a second style character profile image; inputting the second style character profile image and the set style character profile sample image into the character profile discriminative model to obtain a second discrimination result, and determining a real discrimination result between the second style character profile image and the set style character profile sample image; and adjusting parameters in the character discriminative model according to a loss function between the second discrimination result and the real discrimination result.

We claim:

1. A method for generating character style profile image, comprising:

inputting an original character profile image into a first feature encoder to obtain first character profile feature code;

determining an attribute increment between the original character profile image and a template image, the attribute increment being obtained via a difference between character attribute information obtained from the original character profile image and template attribute information obtained from the template image;

inputting the attribute increment and the first character profile feature code into a second feature encoder to obtain a second character profile feature code;

inputting the second character profile feature code into a style profile generative model to obtain an initial character style profile image; and merging the initial character style profile image into the template image to obtain a target character style profile image.

2. The method of claim 1, wherein the merging the initial character style profile image into the template image to obtain a target character style profile image comprises:

translating a position of a character style profile in the initial character style profile image; and merging the initial character style profile image after translation into the template image to obtain the target character style profile image.

3. The method of claim 2, wherein the translating a position of a character style profile in the initial character style profile image comprises:

obtaining a vertical standard line and a horizontal standard line of the initial character style profile image;

extracting a central key point and a mouth corner key point of the character style profile in the initial character style profile image;

determining a distance difference between a vertical coordinate of the central key point and the vertical standard line, and determining the distance difference between the vertical coordinate of the central key point and the vertical standard line as a first distance difference;

determining a distance difference between a horizontal coordinate of the mouth corner key point and the horizontal standard line, and determining the distance difference between the horizontal coordinate of the mouth corner key point and the horizontal standard line as the second distance difference; and translating the character style profile along a vertical direction according to the first distance difference, and translating the character style profile along a horizontal direction according to the second distance difference.

4. The method of claim 1, wherein the merging the initial character style profile image into the template image to obtain a target character style profile image comprises:

recognizing a template character profile in the template image to obtain a recognition rectangle box;

cropping the initial character style profile image into an image of a set size according to the recognition rectangle box;

pasting the image of the set size into the recognition rectangle box;

obtaining a character profile mask image of the template image; and merging the image of the set size pasted into the recognition rectangle box into the template image based on the character profile mask image, to obtain the target character style profile image.

5. The method of claim 1, wherein a way for training the first feature encoder comprises:

obtaining a character profile sample image;

inputting the character profile sample image into a to-be-trained first feature encoder to obtain a first sample character profile feature code;

inputting a first sample character profile feature code into a character profile generative model to obtain a first reconstructed character profile image; and training the to-be-trained first feature encoder based on a loss function between the first reconstructed character profile image and the character profile sample image to obtain the first feature encoder.

6. The method of claim 1, wherein a way for training the second feature encoder comprises:

obtaining a character profile sample image;

inputting the character profile sample image into the first feature encoder to obtain a second sample character profile feature code;

inputting the second sample character profile feature code into a character profile generative model to obtain a second reconstructed character profile image;

inputting the second sample character profile feature code and a real attribute increment into a to-be-trained second feature encoder to obtain a third sample character profile feature code;

inputting the third sample character profile feature code into the character profile generative model to obtain an edited character profile image;

determining a predictive attribute increment between the second reconstructed character profile image and the edited character profile image; and training the to-be-trained second feature encoder based on a loss function between the predictive attribute increment and the real attribute increment to obtain the second feature encoder.

7. The method of claim 1, wherein a way for training the style profile generative model comprises:

cross-iteratively training a character profile generative model and a character profile discriminative model until an accuracy of a discrimination result output by the character profile discriminative model meets a set condition, and determining the trained character profile generative model as the style profile generative model;

a process of the cross-iteratively training comprises:

obtaining a set style character profile sample image;

inputting first random noise data into the character profile generative model to obtain a first style character profile image;

inputting the first style character profile image and the set style character profile sample image into the character profile discriminative model to obtain a first discrimination result;

adjusting parameters in the character profile generative model based on the first discrimination result;

inputting second random noise data into the adjusted character profile generative model to obtain a second style character profile image;

inputting the second style character profile image and the set style character profile sample image into the character profile discriminative model to obtain a second discrimination result, and determining a real discrimination result between the second style character profile image and the set style character profile sample image; and adjusting parameters in the character discriminative model according to a loss function between the second discrimination result and the real discrimination result.

8. An electronic device comprising:

at least one processing apparatus;

a storage apparatus configured to store at least one program;

when the at least one program is executed by the at least one processing apparatus, the at least one processing apparatus implements acts for generating character style profile image, the acts comprising:

inputting an original character profile image into a first feature encoder to obtain first character profile feature code;

determining an attribute increment between the original character profile image and a template image, the attribute increment being obtained via a difference between character attribute information obtained from the original character profile image and template attribute information obtained from the template image;

inputting the attribute increment and the first character profile feature code into a second feature encoder to obtain a second character profile feature code;

inputting the second character profile feature code into a style profile generative model to obtain an initial character style profile image; and merging the initial character style profile image into the template image to obtain a target character style profile image.

9. The device of claim 8, wherein the merging the initial character style profile image into the template image to obtain a target character style profile image comprises:

translating a position of a character style profile in the initial character style profile image; and merging the initial character style profile image after translation into the template image to obtain the target character style profile image.

10. The device of claim 9, wherein the translating a position of a character style profile in the initial character style profile image comprises:

obtaining a vertical standard line and a horizontal standard line of the initial character style profile image;

extracting a central key point and a mouth corner key point of the character style profile in the initial character style profile image;

determining a distance difference between a vertical coordinate of the central key point and the vertical standard line, and determining the distance difference between the vertical coordinate of the central key point and the vertical standard line as a first distance difference;

determining a distance difference between a horizontal coordinate of the mouth corner key point and the horizontal standard line, and determining the distance difference between the horizontal coordinate of the mouth corner key point and the horizontal standard line as the second distance difference; and translating the character style profile along a vertical direction according to the first distance difference, and translating the character style profile along a horizontal direction according to the second distance difference.

11. The device of claim 8, wherein the merging the initial character style profile image into the template image to obtain a target character style profile image comprises:

recognizing a template character profile in the template image to obtain a recognition rectangle box;

cropping the initial character style profile image into an image of a set size according to the recognition rectangle box;

pasting the image of the set size into the recognition rectangle box;

obtaining a character profile mask image of the template image; and merging the image of the set size pasted into the recognition rectangle box into the template image based on the character profile mask image, to obtain the target character style profile image.

12. The device of claim 8, wherein a way for training the first feature encoder comprises:

obtaining a character profile sample image;

inputting the character profile sample image into a to-be-trained first feature encoder to obtain a first sample character profile feature code;

inputting a first sample character profile feature code into a character profile generative model to obtain a first reconstructed character profile image; and training the to-be-trained first feature encoder based on a loss function between the first reconstructed character profile image and the character profile sample image to obtain the first feature encoder.

13. The device of claim 8, wherein a way for training the second feature encoder comprises:

obtaining a character profile sample image;

inputting the character profile sample image into the first feature encoder to obtain a second sample character profile feature code;

inputting the second sample character profile feature code into a character profile generative model to obtain a second reconstructed character profile image;

inputting the second sample character profile feature code and a real attribute increment into a to-be-trained second feature encoder to obtain a third sample character profile feature code;

inputting the third sample character profile feature code into the character profile generative model to obtain an edited character profile image;

determining a predictive attribute increment between the second reconstructed character profile image and the edited character profile image; and training the to-be-trained second feature encoder based on a loss function between the predictive attribute increment and the real attribute increment to obtain the second feature encoder.

14. The device of claim 8, wherein a way for training the style profile generative model comprises:

cross-iteratively training a character profile generative model and a character profile discriminative model until an accuracy of a discrimination result output by the character profile discriminative model meets a set condition, and determining the trained character profile generative model as the style profile generative model;

a process of the cross-iteratively training comprises:

obtaining a set style character profile sample image;

inputting first random noise data into the character profile generative model to obtain a first style character profile image;

inputting the first style character profile image and the set style character profile sample image into the character profile discriminative model to obtain a first discrimination result;

adjusting parameters in the character profile generative model based on the first discrimination result;

inputting second random noise data into the adjusted character profile generative model to obtain a second style character profile image;

inputting the second style character profile image and the set style character profile sample image into the character profile discriminative model to obtain a second discrimination result, and determining a real discrimination result between the second style character profile image and the set style character profile sample image; and adjusting parameters in the character discriminative model according to a loss function between the second discrimination result and the real discrimination result.

15. A non-transitory computer-readable medium having a computer program stored thereon, when executed by a processing apparatus, the computer program implements acts for generating character style profile image, the acts comprising:

inputting an original character profile image into a first feature encoder to obtain first character profile feature code;

determining an attribute increment between the original character profile image and a template image, the attribute increment being obtained via a difference between character attribute information obtained from the original character profile image and template attribute information obtained from the template image;

inputting the attribute increment and the first character profile feature code into a second feature encoder to obtain a second character profile feature code;

inputting the second character profile feature code into a style profile generative model to obtain an initial character style profile image; and merging the initial character style profile image into the template image to obtain a target character style profile image.

16. The medium of claim 15, wherein the merging the initial character style profile image into the template image to obtain a target character style profile image comprises:

translating a position of a character style profile in the initial character style profile image; and merging the initial character style profile image after translation into the template image to obtain the target character style profile image.

17. The medium of claim 16, wherein the translating a position of a character style profile in the initial character style profile image comprises:

obtaining a vertical standard line and a horizontal standard line of the initial character style profile image;

extracting a central key point and a mouth corner key point of the character style profile in the initial character style profile image;

determining a distance difference between a vertical coordinate of the central key point and the vertical standard line, and determining the distance difference between the vertical coordinate of the central key point and the vertical standard line as a first distance difference;

determining a distance difference between a horizontal coordinate of the mouth corner key point and the horizontal standard line, and determining the distance difference between the horizontal coordinate of the mouth corner key point and the horizontal standard line as the second distance difference; and translating the character style profile along a vertical direction according to the first distance difference, and translating the character style profile along a horizontal direction according to the second distance difference.

18. The medium of claim 15, wherein the merging the initial character style profile image into the template image to obtain a target character style profile image comprises:

recognizing a template character profile in the template image to obtain a recognition rectangle box;

cropping the initial character style profile image into an image of a set size according to the recognition rectangle box;

pasting the image of the set size into the recognition rectangle box;

obtaining a character profile mask image of the template image; and merging the image of the set size pasted into the recognition rectangle box into the template image based on the character profile mask image, to obtain the target character style profile image.

19. The medium of claim 15, wherein a way for training the first feature encoder comprises:

obtaining a character profile sample image;

inputting the character profile sample image into a to-be-trained first feature encoder to obtain a first sample character profile feature code;

inputting a first sample character profile feature code into a character profile generative model to obtain a first reconstructed character profile image; and training the to-be-trained first feature encoder based on a loss function between the first reconstructed character profile image and the character profile sample image to obtain the first feature encoder.

20. The medium of claim 15, wherein a way for training the second feature encoder comprises:

obtaining a character profile sample image;

inputting the character profile sample image into the first feature encoder to obtain a second sample character profile feature code;

inputting the second sample character profile feature code into a character profile generative model to obtain a second reconstructed character profile image;

inputting the second sample character profile feature code and a real attribute increment into a to-be-trained second feature encoder to obtain a third sample character profile feature code;

inputting the third sample character profile feature code into the character profile generative model to obtain an edited character profile image;

determining a predictive attribute increment between the second reconstructed character profile image and the edited character profile image; and training the to-be-trained second feature encoder based on a loss function between the predictive attribute increment and the real attribute increment to obtain the second feature encoder.

* * * * *